United States Patent [19]

Lisec

[11] Patent Number: 4,589,541
[45] Date of Patent: May 20, 1986

[54] DEVICE FOR THE CONVEYANCE OF TABULAR ELEMENTS

[76] Inventor: Peter Lisec, Bahnhofstrasse 34, Amstetten-Hausmening, Austria

[21] Appl. No.: 570,196

[22] Filed: Jan. 12, 1984

[30] Foreign Application Priority Data

Apr. 25, 1983 [AT] Austria ................................ 1498/83

[51] Int. Cl.$^4$ ............................................. B65G 25/00
[52] U.S. Cl. .................. 198/468.4; 198/619; 198/575
[58] Field of Search ............... 198/486, 649, 650, 689, 198/620, 621, 575, 619, 577, 487, 614, 468.4, 468.9; 414/749–752

[56] References Cited

U.S. PATENT DOCUMENTS

| 2,671,241 | 3/1954 | Starner | 198/650 X |
|---|---|---|---|
| 3,331,485 | 7/1967 | Temple | 198/487 X |
| 3,881,618 | 5/1975 | Tavshek | 414/752 X |
| 3,992,182 | 11/1976 | Frank | 198/577 X |
| 4,166,527 | 9/1979 | Beezer | 198/486 |
| 4,422,541 | 12/1983 | Lisec | 198/649 X |
| 4,457,423 | 7/1984 | Stoll | 198/619 |

OTHER PUBLICATIONS

Engineering Materials and Design, Feb. 1978, vol. 22, No. 2.

Primary Examiner—Joseph E. Valenza
Assistant Examiner—Michael Stone
Attorney, Agent, or Firm—Young & Thompson

[57] ABSTRACT

A towing device (23, 35) which seizes a tabular element (1) on at least one of its side surfaces in conjunction with a device for the conveyance of tabular elements, e.g., insulating glass panes. In addition, a horizontal conveyor belt (3, 14) at least partially supports the tabular elements from below. The towing device (23, 35) is displaceably guided back and forth on a guideway (25, 26; 40) parallel to the conveyance direction (20) and is synchronized in its movement in the conveyance direction (20) with the transport element (14) of the conveyor belt, either by interengaging stops (32, 33) on the towing device and conveyor belt, or else by a transmission (38) that drives the towing device at precisely the speed of the conveyor belt.

6 Claims, 3 Drawing Figures

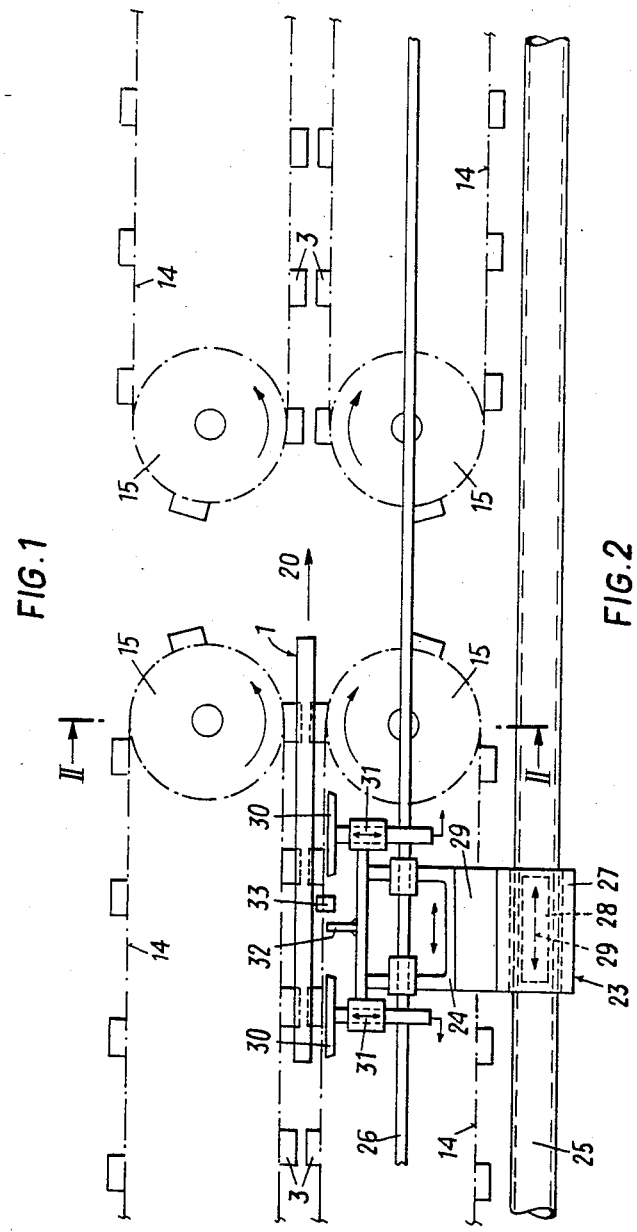
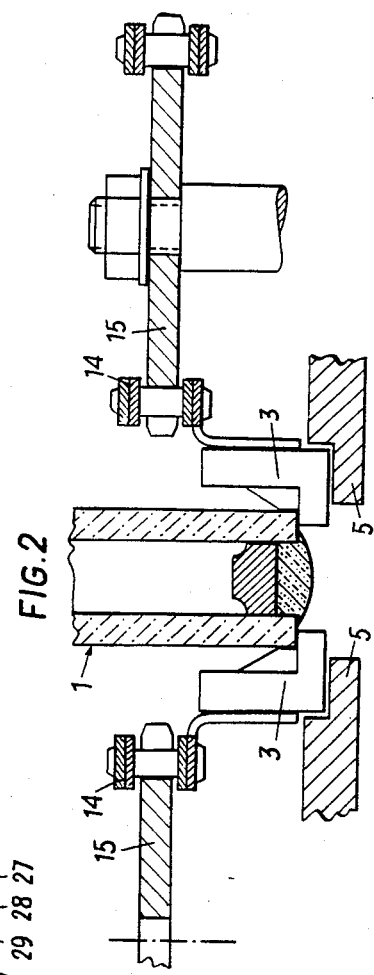

DEVICE FOR THE CONVEYANCE OF TABULAR ELEMENTS

The invention relates to a device for the conveyance of tabular elements, especially insulating glass panes, with a horizontal conveyor belt with which the tabular elements are supported from below.

The insulating glass panes, in the course of their production, are transported standing upright upon horizontal conveyor belts. These conveyor belts can comprise simple, endless conveyor bands as transport elements, for which conveyor belts provided with lugs have been proposed (cf. DE-AS 28 46 785). Another conveyor belt which is especially suited for insulating glass elements with their edges filled with sealing material, is described in U.S. patent application Ser. No. 281,706, filed July 9, 1981.

Frequently the problem is posed with the conveyance of tabular elements, for example insulating glass panes, of assuring a precisely uniform transport. For this purpose the conveyance system of the above U.S. application is best suited since the gripping jaws holding the insulating glass panes from below can also be pressed against the insulating glass panes for achieving the necessary friction contact. This, however, is not always sufficient since, especially in the case of pressure-sensitive tabular elements, the pressure required for the necessary friction contact would lead to damage to the tabular elements. An additional problem with conveyance systems is that processing tools (e.g. sealing nozzles for insulating glass panes) are frequently provided on the conveyor belts, so that successive conveyor belts have gaps therebetween. To move the insulating glass panes further by suction means, as proposed in DE-AS No. 28 46 785, brings with it the danger that the panes of unfinished insulating glass will be displaced opposite each other or even be released from the spacer frames if the unfinished insulating glass panes are held at only one side by one or more suction plates.

The object of the invention is to provide a device with which tabular elements can be towed safely and with a constant speed on conveyor belts which can also be conventional conveyor belts.

According to the invention, this is achieved by providing a towing element which engages the tabular element on at least one of its side surfaces. The towing device is guided displaceably back and forth on a guideway positioned parallel to the horizontal conveyor belt, i.e., the direction of conveyance. The towing device is synchronized in its movement with the transport element which forms the conveyor belt. Because a towing device is provided which grasps the tabular element to be transported and coordinates the speed of movement of the towing device precisely with the speed of the conveyor belt, an absolutely uniform transport of the tabular elements is assured even across the gaps between successive conveyor belts. If the conveyor belt employed is one of the type in accordance with the above U.S. application, then the pressure exerted upon the insulating glass pane by the conveyor components acting upon the insulating glass panes can be reduced without adverse effect upon the constancy of the conveying speed of the tabular elements.

Provision can be made within the scope of the invention that the towing device comprise at least one suction plate which can be thrust forward at a right angle to the conveyance direction upon the tabular element to be conveyed. This embodiment is especially suitable for the conveyance of insulating glass elements.

Provision can also be made within the scope of the invention that fluid pressure means be provided for the forward thrusting of the suction plate which can be activated only with the towing device in motion at transport speed in the conveyance direction. With this embodiment the application of the towing device to the tabular elements is possible in a particularly simple fashion and without disturbing the motion of the elements.

In one embodiment of the invention, the device is characterized by the fact that for the movement of the towing device, a cylinder arranged parallel to the conveyance direction is provided in which a piston is positioned, displaceable back and forth by application of pressure means, wherein the towing device is magnetically coupled to the reciprocally displaceable piston in the cylinder. This embodiment is especially suitable for combination with the conveyor belt of the above U.S. application.

Another device suitable, according to the invention, for combination with the conveyor belt in accordance with the U.S. application is characterized by the fact that a tensioned element such as a belt, chain, toothed belt or the like, turning around two guide wheels and synchronized as to speed with the transport elements, is provided whose parts are arranged parallel to the conveyance direction and that the towing device, or its cradle, is coupled to the tensioned element by a guide rod.

Further characteristics and details of the invention will be seen from the following description of the embodiments indicated diagrammatically in the drawings, in which:

FIG. 1 shows a first embodiment of the invention seen diagrammatically in plan view;

FIG. 2 shows an embodiment, known in the art, of the conveyor belt lifting lugs which support the tabular elements from below.

Figure 3:
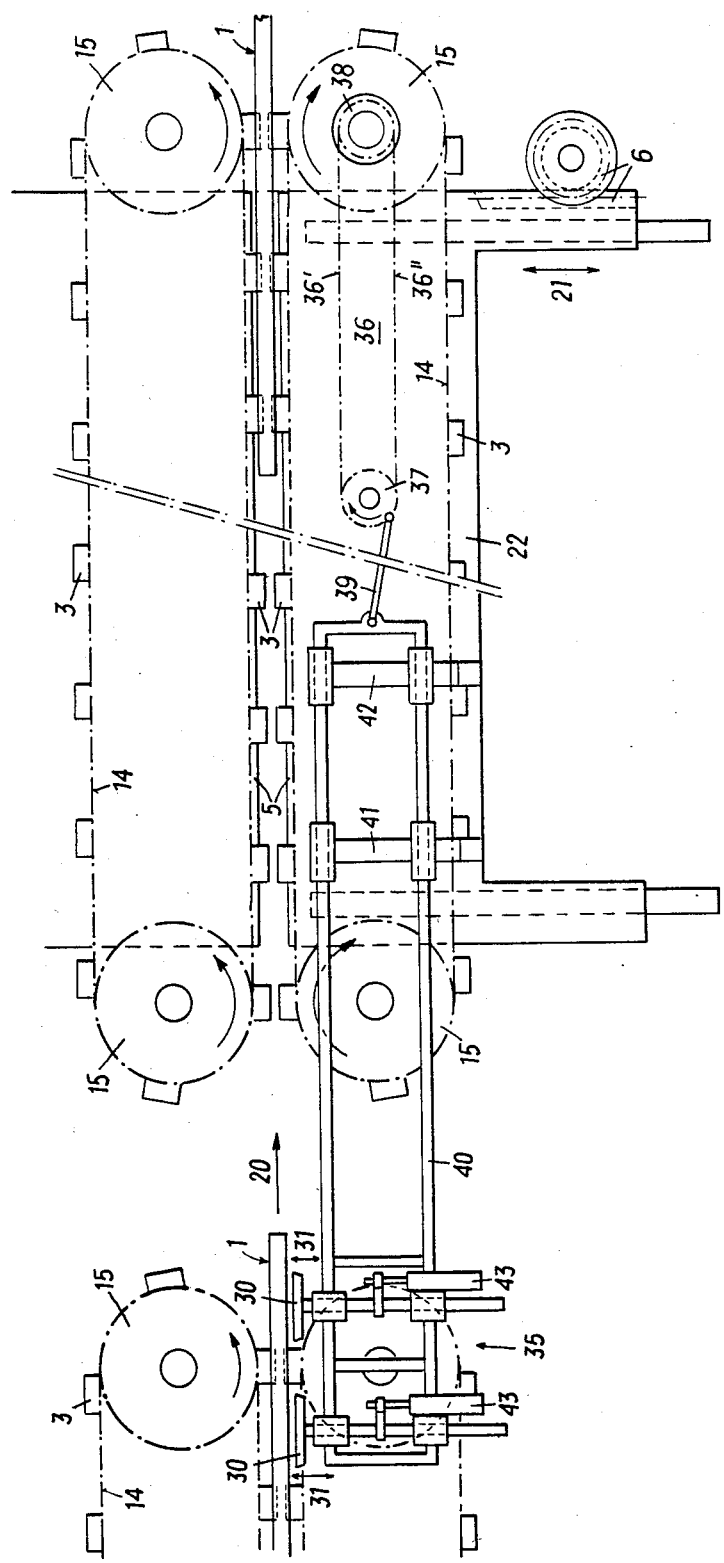
FIG. 3 shows another embodiment seen diagrammatically and in plan view.

The conveyor belt shown in FIGS. 1 and 2 comprises two chains 14 each turning around guide wheels 15, with gripping lugs fixed to the chains, the lugs having the form indicated in cross section in FIG. 2 and which support the insulating glass elements from below only in the zone of their exterior edges. The moving parts of the chains 14 are guided on tracks 5 in the conveyance direction (arrow 20).

For adjustment to varying thicknesses of insulating glass elements 1, one of the two chains 14 as shown in FIG. 3 can be moved toward the other chain in the direction of the double arrow 21. For this purpose, the guide wheels 15 for the chain 14 which can be moved at a right angle to the conveyance direction (arrow 20) and the support track 5 are fastened to a displaceable supporting beam 22 which is moved by a rack and pinion drive 6.

In the embodiment shown in FIG. 1, the cradles 24 which form the towing mechanism 23 are guided displaceably on a cylinder 25 and guidance tracks 26, wherein the cylinders 25 and the tracks 26 extend parallel to the conveyance direction 20. Both the cylinder 25 and the tracks 26 are, for example, mounted on a supporting beam which is not shown in FIG. 1.

For its guidance, the cradle 24 has a ring 27 which slides over a ball bearing on the exterior of the cylinder 25. A piston 28 is provided in the cylinder 25 which can be thrust back and forth in the direction of the double arrow 29 by the application of pressure to the sealed cylinder. To couple the cradle 24 with the piston 28, the latter is designed as a permanent magnet and the cradle 24 has a corresponding countermagnet or simply a block of magnetizable material such as iron, so that the piston 28 is magnetically coupled to the cradle 24. Two suction plates 30 are provided on the cradle 24 which, by means of pressure motors (not shown), can be moved back and forth in the direction of the double arrow 31.

In addition, the cradle 24 carries a stop 32 which operates in conjunction with one or one of several stops 33 provided on the chains 14 to keep the speed of the towing device 23 precisely coordinated with the conveyance speed of the insulating glass element 1. In the embodiment shown, the stop 32 provided on the cradle 24, seen in the conveyance direction, is pressed from behind against the stop 33 by application of pressure to the piston 28. It will of course be understood that the magnetic drive of the towing device 23 is not a positive drive but rather comprises in effect a slipping clutch by which the speed of the towing device 23 is limited to precisely the speed of the chains 14 by the interengagement of the stops 32 and 33.

As soon as the cradle 24 is synchronized with the chains forming the conveyor belt with respect to the transport speed, the suction plates 30 are thrust forward and acted on by a vacuum so that the insulating glass element 1 is no longer carried forward only by the conveyor belt but also by the towing mechanism 23. This is of special importance if, as shown in FIGS. 1 and 3, there are gaps in the series of conveyor means. These gaps are unavoidable for receiving finishing tools, specifically of filling nozzles, in devices for the sealing of unfinished insulating glass.

In accordance with one embodiment not shown, stops 33 are also provided on the right hand chain 14 in FIG. 1, whereby the cradle 24 of the towing device 23 expediently carries a second stop 32 which works in conjunction with the stop 33 of the second conveyor belt seen in the conveyance direction 20. With this embodiment a jolt-free transfer of the towing device 23 from the first to the second conveyor belt is assured. Several stops 33 can, of course, be provided on one or both of the conveyor belts.

In the embodiment shown in FIG. 3, an endless tensioned element 36 is provided for synchronizing the movement of the towing device 35, the parts of which are arranged parallel to the conveyance direction 20. In the embodiment shown, one of the two guide wheels 37 for the tensioned element 36 is driven by a transmission 38 on one of the guide wheels for the chain 14, whose gear ratio is such that the linear speed of element 36 is precisely the same as that of chain 14. The endless element 36 is coupled with a cradle 40 of the towing device 35 by a guide rod 39. The cradle 40 is guided displaceably back and forth parallel to the conveyance direction 20 by the bearing blocks 41, 42 provided on the supporting beam 22. The transmission 38 includes a releasable coupling (not shown) so that movement of the cradle 40 can be stopped in its starting position.

At one end the cradle 40 carries two suction plates 30 which can be thrust forward and back in the direction of the arrows 31 by a fluid pressure cylinder.

When the towing device 35 is in use, the suction plates 30 are thrust forward and seize an insulating glass element 1. As soon as the pivotal connection of the guide rod 39 to the tensioned element 36 has reached the end of the part of the tensioned element running parallel to the conveyance direction, suction plates are caused to release the insulating glass element 1. By continued circulation of element 36, the towing apparatus 35 can again be moved back into its starting position, where the coupling of the transmission 38 is released.

The return movement of the towing mechanism 23 in the embodiment shown in FIG. 1 occurs through corresponding pressure application of the piston 28.

The towing devices 23 and 35 can also be guided on profiled tracks. In this case, in the embodiment shown in FIG. 1, the tracks 36 are eliminated and, in the embodiment shown in FIG. 3, only one of the tracks 40 need be provided.

What is claimed is:

1. Device for the conveyance of a tabular element (1) on edge, comprising horizontal conveyor belt means (3, 14) in two sections having a gap therebetween, by means of which the tabular element (1) is supported from below, a towing device (23, 35) which seizes the tabular element (1) on at least one of its side surfaces, a guideway (25, 26; 40) on which the towing device (23, 35) is guided displaceably back and forth in a direction parallel to the conveyance direction (20), the guideway being of a length such that the towing device (23, 35) moves with the tabular element (1) it has seized, from one said conveyor belt section across said gap until the tabular element is again supported from below the other said conveyor belt section, and means to fix the linear speed of the towing device (23, 35) in the conveyance direction (20) at precisely that of the conveyor belt (3, 14), the towing device (23) being coupled with the conveyor belt (3, 14) for synchronizing its speed of movement with the speed of the conveyor belt (3, 14), and stops (32, 33) which engage with each other on both the conveyor belt (3, 14) and the towing device (23).

2. Device as claimed in claim 1, wherein the towing device (23, 35) comprises at least one suction plate (30) displaceable at a right angle to the conveyance direction (20) toward and away from the tabular element (1) to be conveyed.

3. Device as claimed in claim 2, and a fluid pressure motor (43) for the forward thrusting of the suction plate (30) which can be activated only when the towing device (23, 35) is moving in the conveyance direction (20).

4. Device as claimed in claim 1, and a cylinder (25) for movement of the towing device (23), said cylinder being disposed parallel to the conveyance direction (20), a piston (28) disposed for reciprocation in the cylinder, and means magnetically coupling the towing device (23) to the reciprocally displaceable piston (28) in the cylinder (25).

5. Device as claimed in claim 4, and guidance track means (26) parallel to the cylinder (25), the towing apparatus (23) sliding upon the cylinder (25) and also upon the guidance track means (26).

6. Device as claimed in claim 1, wherein the stop (32) on the towing device (23), seen in the conveyance direction (20), is pressed against the stop (33) on the conveyor belt (3, 14) from behind by the pressure of a piston (28) in a cylinder (25).

* * * * *